(12) United States Patent
Ainslie (10) Patent No.: US 8,966,582 B1
(45) Date of Patent: Feb. 24, 2015

(54) AUTOMATIC DETECTION AND WARNING REGARDING POTENTIALLY MALICIOUS SITES

(75) Inventor: Alex Neely Ainslie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 47 days.

(21) Appl. No.: 13/425,375

(22) Filed: Mar. 20, 2012

(51) Int. Cl.
*G06F 1/04* (2006.01)
*G06F 11/00* (2006.01)

(52) U.S. Cl.
USPC .................................. 726/2; 726/22

(58) Field of Classification Search
CPC .......... G06F 21/554; G06F 2221/2119; H04B 7/18593
USPC .................................. 726/2, 22, 24
See application file for complete search history.

(56) References Cited

U.S. PATENT DOCUMENTS

| 7,822,620 B2 | 10/2010 | Dixon et al. | |
| 8,019,689 B1* | 9/2011 | Nachenberg | 705/64 |
| 2006/0253583 A1* | 11/2006 | Dixon et al. | 709/225 |
| 2007/0112814 A1* | 5/2007 | Cheshire | 707/101 |
| 2009/0249229 A1* | 10/2009 | Offer | 715/760 |
| 2009/0287653 A1* | 11/2009 | Bennett | 707/3 |
| 2010/0333204 A1* | 12/2010 | Shpits | 726/24 |
| 2011/0083185 A1* | 4/2011 | Sheleheda et al. | 726/24 |
| 2012/0131187 A1* | 5/2012 | Cancel et al. | 709/224 |

OTHER PUBLICATIONS

"Phishing and malware detection," Google Chrome Help, Sep. 20, 2011, http://www.google.com/support/chrome/bin/answer.py?answer=99020, 2 pgs.

* cited by examiner

*Primary Examiner* — Michael Chao
*Assistant Examiner* — Shiuh-Huei Ku
(74) *Attorney, Agent, or Firm* — McDermott Will & Emery LLP (57) ABSTRACT

A system and computer-implemented method for providing an indication of a quality of a site to a user, the method comprising identifying a link associated with a destination site and being displayed at a source site, determining a reputation of the link based on one or more criteria and whether the determined reputation of the link meets or exceeds a specified threshold and providing a warning for display to a user at the source site when it is determined that the reputation of the link meets the specified threshold, wherein the warning display includes a warning message indicating that the link meets or exceeds the specified threshold and a thumbnail image of the destination site associated with the link.

20 Claims, 4 Drawing Sheets

AUTOMATIC DETECTION AND WARNING REGARDING POTENTIALLY MALICIOUS SITES

BACKGROUND

The subject disclosure generally relates to improving the web browsing experience of a user, and, in particular, to detection and warnings regarding undesirable, untrustworthy and/or malicious sites.

While viewing online content a user may be provided with links to additional content related to the displayed content. For example, on blogs and other user generated content sites, users may post related content using links to the additional or related content. Similarly, links to blogs, articles and other online content may be provided within posts, blogs or other user-generated internet content.

Because the content is represented simply using a hyperlink or link to the content, there is an increased danger of the links directing the user to an untrustworthy, malicious or undesirable destination site. Often spammers may use comments to blogs, posts or articles to post links to malicious internet sites and content. Currently, the safeguard to such malicious content is the use of internet filtering mechanisms, which warn the user once the user has been directed to the site after clicking on the link. This solution is limiting as it leads to the user being redirected from their original position within the internet and may not always cover all sites that may be malicious or otherwise undesirable for the user.

Thus, it may be desirable to facilitate an improved and efficient method of detecting malicious or undesirable sites and providing warning to the user.

SUMMARY

The disclosed subject matter relates to a computer-implemented method for providing an indication of a quality of a site to a user, the method comprising identifying a link associated with a destination site and being displayed at a source site. The method further comprising determining a reputation of the link based on one or more criteria and whether the determined reputation of the link meets or exceeds a specified threshold and providing a warning for display to a user at the source site when it is determined that the reputation of the link meets the specified threshold, wherein the warning display includes a warning message indicating that the link meets or exceeds the specified threshold and a thumbnail image of the destination site associated with the link.

The disclosed subject matter also relates to a system for providing an indication of a quality of a site to a user, the system comprising one or more processors and a machine-readable medium comprising instructions stored therein, which when executed by the processors, cause the processors to perform operations comprising receiving an indication of a user action with respect to a link associated with a destination site and being displayed on a source site. The operations further comprising determining a reputation of the link based on one or more criteria and whether the determined reputation of the link meets or exceeds a specified threshold, wherein the determined reputation meeting the specified threshold indicates that the destination site is an undesirable, untrustworthy or malicious site and providing a warning for display to the user at the source site when it is determined that the determined reputation of the link meets or exceeds the specified threshold, wherein the displayed warning includes a warning message indicating that the reputation meets or exceeds the specified threshold and a thumbnail image of the destination site associated with the link.

The disclosed subject matter also relates to a machine-readable medium comprising instructions stored therein, which when executed by a machine, cause the machine to perform operations comprising identifying a link associated with a destination site and being displayed on a source site being viewed by a user. The operations further comprising determining a reputation of the link based on one or more criteria including one or more of user feedback data regarding the link or the destination site, one or more characteristics indicative of the link reputation, or historical information regarding user interaction with one or more of the link or the destination site. The operations further comprising determining whether the determined reputation of the link meets or exceeds a specified threshold indicating that the link is undesirable, untrustworthy or malicious and providing a warning for display to the user at the source site when it is determined that the reputation of the link meets or exceeds the specified threshold, wherein the warning displayed includes a warning message indicating that the link meets or exceeds the specified threshold and a thumbnail image of the destination site associated with the link.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The present disclosure provides a method for automatically detecting the reputation of a link (e.g., links that redirect the user to a spam site, or other malicious site) and providing the user with a warning if the link and/or the site (or pages on the site) associated with the link is determined to have a quality or reputation indicating an untrustworthy or malicious site, such that the user may refrain from visiting the site. The warning may be presented to the user once the user clicks the link or hovers over the link, or takes any other action indicating that the user would like to follow the link, but before the browser redirects the user to the destination site. Alternatively, for all links provided within a web document, the system may automatically determine if a link is directed to an untrustworthy site and may generate an icon or other visual representation indicating that the link is untrustworthy or malicious (e.g., spam).

The system may perform the detection process based on one or more criteria. For example, the system may have access to one or more existing lists which include known undesirable, untrustworthy and/or malicious links and/or destination sites. The lists may include a listing generated by system developers and/or in response to users reporting a link or the site associated with the link as undesirable, untrustworthy and/or malicious. The entries within lists may be personalized to the specific user (i.e., based on sites reported by the user as spam) or may be global (i.e., based on a report by any user). The system may further use the information provided by the one or more lists to learn common characteristics of links leading to undesirable, untrustworthy and/or malicious sites. For example, typically such sites have a specific type of link name, link identifier, number of redirects, and other such characteristics which are common among links to malicious or untrustworthy websites. Such characteristics can be learned and used as criteria for detecting whether a link is untrustworthy. Other criteria may include the number of redirects caused by following the link which may be an indicator of a malicious site. Additionally, one or more characteristics may be explicitly provided by a user, system administrator or a supervisory user, which indicated characteristics of sites that the user should be discouraged from accessing (e.g., based on company policy, user preferences).

Furthermore, historical information regarding the interaction of the user and/or other users with the specific link may be used as criteria for determining the reputation of the site. For example, if one or more users rate the site as not being a quality site, the system may use such rating as a signal for determining whether this is a desirable site for the user to visit. Additionally, user feedback may be used to overwrite or bolster a reputation determination. For example, where a warning associated with a specific link is more likely to result in the user remaining at their current location (i.e., refraining from continuing to the site associated with the link) the system may be more confident that the link is in fact an untrustworthy link and may penalize the reputation of the link. On the other hand, where despite the warning users historically choose to continue with visiting the site, the system may determine that the link is directed to a quality site and may stop warning users about the reputation of the site.

The criteria are used to determine a reputation for the link (e.g., by comparing a score calculated for the site to a predefined quality threshold). Once the system has determined that a link is untrustworthy and associated with an undesirable or malicious site (e.g., a score associated with the link calculated based on the criteria is below a confidence threshold), the system may generate a warning message for display to the user.

The warning message may include a general notification telling the user that a link is associated with an undesirable or malicious site. Additionally, the warning may include a preview of the destination site. For example, upon determining that the link is associated with a malicious or otherwise undesirable site, the system may request a preview thumbnail of the main page associated with the site and may provide the preview to the user. In one example, the system has access to a repository of thumbnail images associated with one or more sites. The system may request the thumbnail image and retrieve the thumbnail image associated with the destination site associated with the link. Alternatively, the system may access or request a third party service to access the site (e.g., without redirecting the user) and take a snap shot of the site and generate a thumbnail image. In this manner, the user may view the preview and decide whether to continue to the site based on the preview. Furthermore, the warning may include an explanation of the criteria that led to the warning, such that the user may review the reasons for the warning before making the decision to proceed or refrain from continuing to the destination site. The user's selection may further be received and used to update the list or other historical information relating to the process of determining the reputation of a link. The term site as used herein refers generally to a site and/or pages on a site.

Figure 1:
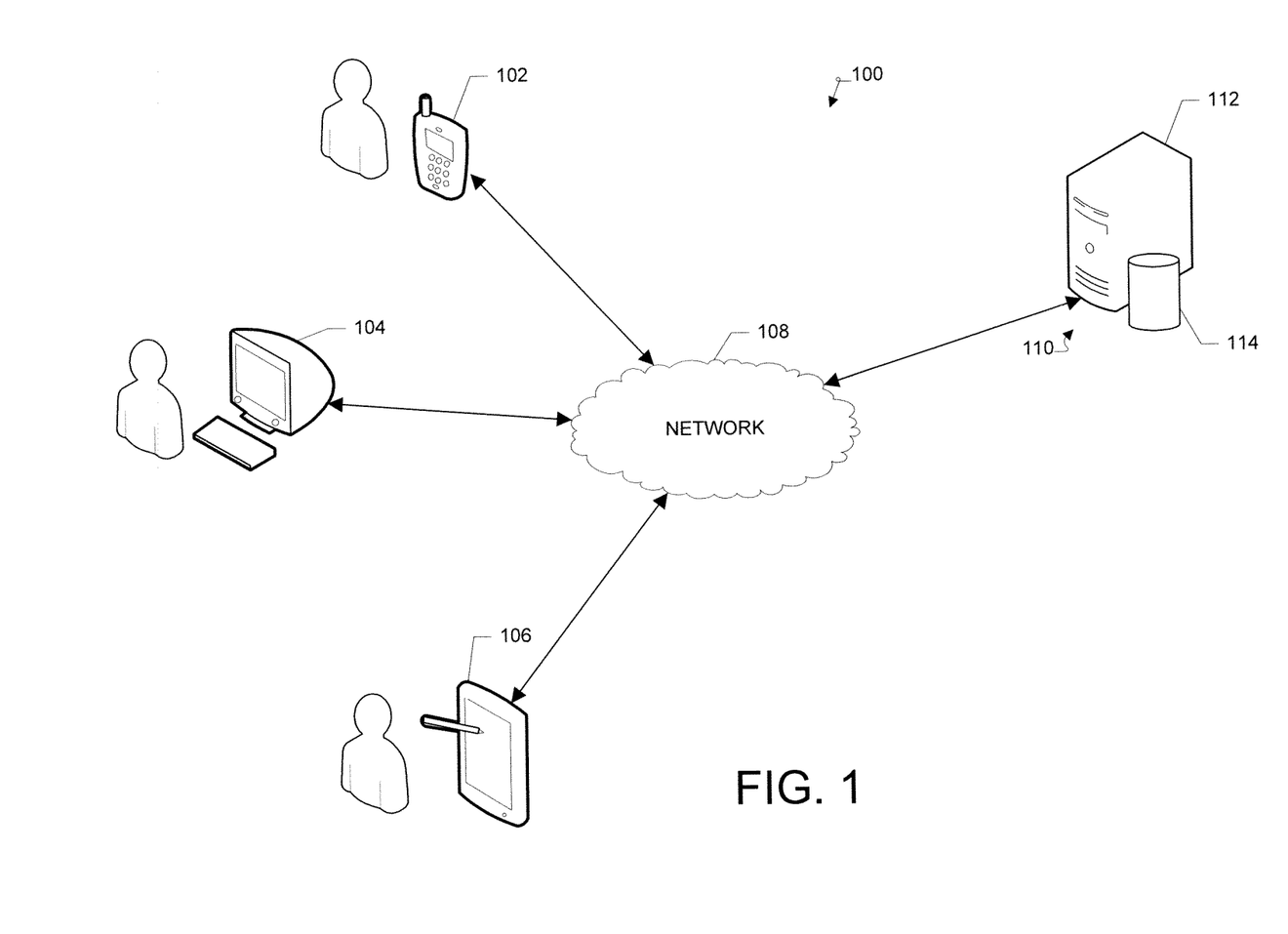
FIG. 1 illustrates an example client-server network environment which provides for facilitating automatic detection and warnings regarding undesirable, untrustworthy and/or malicious sites.

FIG. 1 illustrates an example client-server network environment which provides for facilitating automatic detection and warnings regarding undesirable, untrustworthy and/or malicious sites. A network environment 100 includes a number of electronic devices 102, 104 and 106 communicably connected to a server 110 by a network 108. Server 110 includes a processing device 112 and a data store 114. Processing device 112 executes computer instructions stored in data store 114, for example, to assist in calculating detecting malicious sites and providing warnings to a users interacting with the electronic devices 102, 104 and 106.

In some example embodiments, electronic devices 102, 104 and 106 can be computing devices such as laptop or desktop computers, smartphones, PDAs, portable media players, tablet computers, televisions or other displays with one or more processors coupled thereto or embedded therein, or other appropriate computing devices that can be used to for displaying a web page or web application. In the example of FIG. 1, electronic device 102 is depicted as a smartphone, electronic device 104 is depicted as a desktop computer, and electronic device 106 is depicted as a PDA.

In some example aspects, server 110 can be a single computing device such as a computer server. In other embodiments, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

The system (e.g., hosted at server 110) may receive an indication of a user request to access a site through a link. Alternatively, the system may receive an indication of one or more links including the link being displayed to the user within a browser at the user client device (e.g., electronic devices 102, 104 and 1-6). The system receives information regarding the link including for example the identifier of the link (e.g., the name of the link), the number of redirects associated with the link, the user posting the link, the destination site associated with the link and/or other similar information. The system then determines a reputation of the link based on the information, and one or more reputation criteria. For example, the system may determine a reputation score for the link based on the criteria and may determine if the reputation score satisfies a quality/reputation threshold. If the system determines that the link does not satisfy the reputation threshold, the system then determines that the link is undesirable, untrustworthy and/or malicious and/or otherwise harmful site.

Upon determining that the site (i.e., destination site associated with the link) does not satisfy the threshold, the system generates a warning for display to the user. The warning may be presented to the user in response to the user requesting to follow the link (e.g., once the user clicks the link or hovers over the link, or takes any other action indicating that the user would like to follow the link) or may be displayed next to the link on the current site being displayed to the user including the link (e.g., for example as an icon and/or a link to the full warning). In either case the warning is displayed to the user before the browser redirects the user to the destination site (i.e., the site associated with the link).

Figure 2:
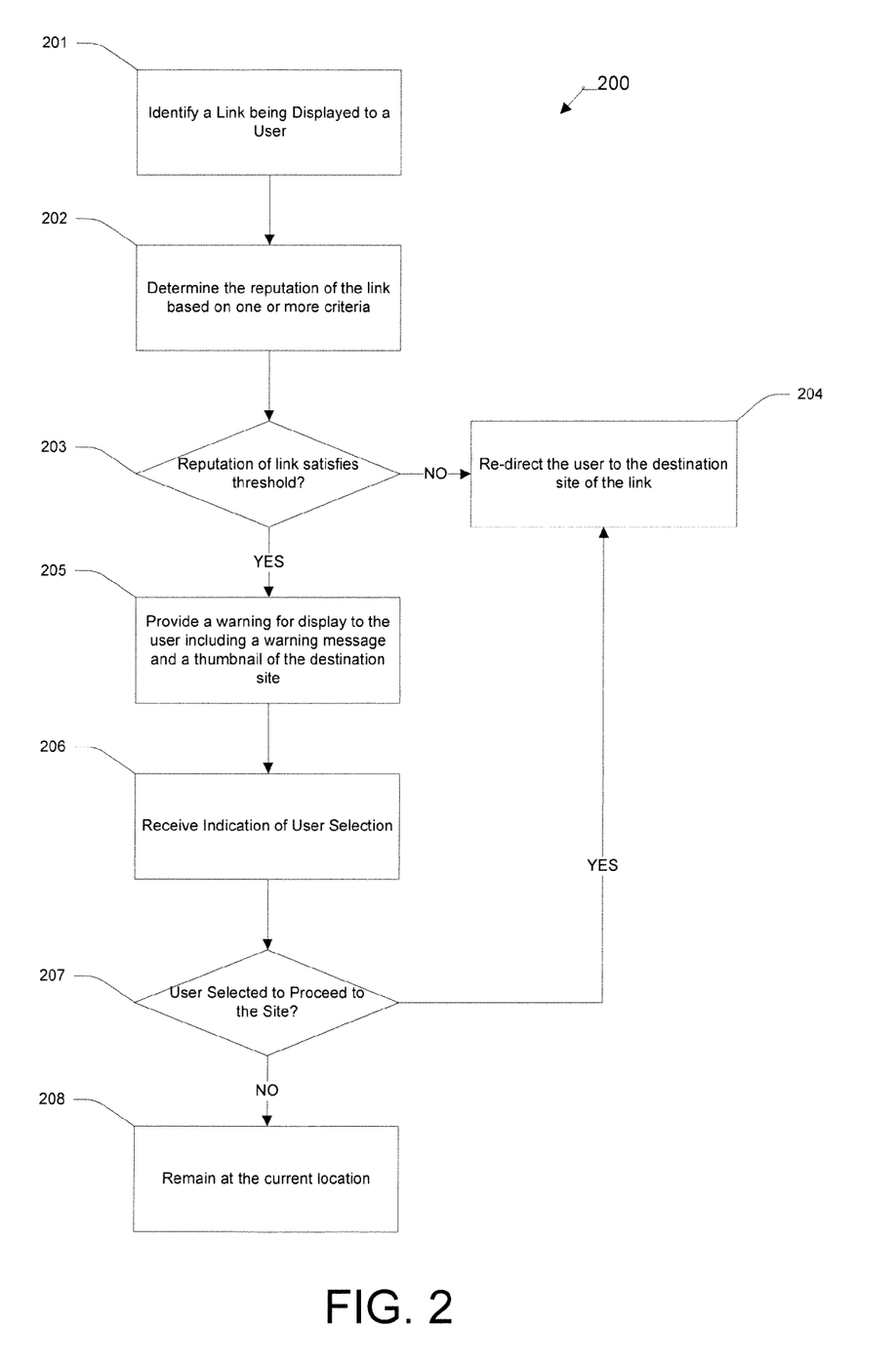
FIG. 2 illustrates a flow diagram of an example process for detecting an undesirable, untrustworthy and/or malicious link and providing a warning to the user.

FIG. 2 illustrates a flow diagram of an example process 200 for detecting an undesirable, untrustworthy and/or malicious link and providing a warning to the user. In step 201, the system identifies a link displayed to a user at a website that the user is currently viewing and selectable to cause the user to be redirected to a destination site associated with the link. For example, a user may be viewing a blog or other website having therein one or more user provided links to other content (e.g., website, blog, media content). The detection of the link may occur in response to receiving an indication of user action with respect to the link. For example the detection of the link may occur once the user clicks on the link or hovers over the link, and/or takes other action indicating that the user would like to follow the link, but before the browser redirects the user to the destination site.

The detection of the link may alternatively occur once the system detects that a website is displayed to the user at a client device, and identifies one or more links within the website including the link. In one example, the process 200 may be performed with respect to all links displayed on a current website being viewed by the user, or may be performed with respect to selected links (e.g., links that the user has taken an action towards). Alternatively, for all links provided within a web document, the system may automatically determine if a link is directed to an undesirable, untrustworthy and/or malicious site and may generate an icon or other visual representation indicating that the link is undesirable, untrustworthy and/or malicious (e.g., spam). The system may determine information regarding the identified link including, for example, the identifier of the link (e.g., the name of the link), the number of redirects associated with the link, the user posting the link, the destination site associated with the link and other similar information.

In step 202, the system determines a reputation of the link based on one or more criteria. For example, the system may have access to one or more repositories including known undesirable, untrustworthy and/or malicious links and/or destination sites. The listing of sites may be personalized to the specific user (i.e., based only on sites reported by the user as spam) or may be global (i.e., base on a report by any user). The system may further have knowledge of one or more characteristics known to be associated with untrustworthy or malicious sites. For example, the characteristics may be learned through machine learning based on characteristics of sites already known by the user to be an untrustworthy or malicious site. Alternatively, a listing of characteristics may be provided to the system by a system developer, administrator or other user having knowledge of characteristics that are common among undesirable, untrustworthy and/or malicious sites. The characteristics may, for example, include the link name, the type of link name, link identifier, number of redirects, trustworthiness ranking (e.g., as provided by user) and other such characteristics. Historical information regarding the interaction of the user and/or other users with the specific link or similar links (e.g., links with same or similar characteristics) may also be used as criteria for determining the reputation of the site. Additionally, user feedback may be used to overwrite or bolster a reputation determination. The system analyzes the link (e.g., based on the information determined and the criteria) to determine a reputation for the link, the reputation being indicative of whether the site is undesirable, untrustworthy and/or malicious. For example, the system may determine a reputation score for the link based on the criteria.

In step 203, the system determines if the reputation of the link (e.g., the reputation score) satisfies a threshold. The system determines if the link is a malicious or otherwise harmful site based on whether the reputation meets or exceeds the specified threshold. When it is determined that the reputation does not satisfy a threshold (e.g., indicating that the site is likely a safe site for the user to visit), the system continues to step 204, and redirects the user to the destination site to the link.

Otherwise, if in step 203, the system determines that the reputation of the link satisfies a threshold, the system concludes that the link is undesirable, untrustworthy and/or malicious and associated with an undesirable, untrustworthy or malicious site, the system continues to step 205. In step 205, the system generates a warning for display to the user. The warning may include a warning message telling the user that a link is associated with an undesirable, untrustworthy and/or malicious site. Additionally, the warning may include a thumbnail preview of the destination site. The system may request a preview thumbnail of the main page associated with the destination site associated with the link and may provide the preview to the user. In this manner, the user may view the preview and decide whether to continue to the site based on the preview. Furthermore, the warning may include an explanation of the reasons that led to the warning, such that the user may review the reasons for the warning before making the decision to proceed or refrain from continuing to the site. In one example, the system may provide the user with mechanisms for allowing the user to accept the warning and remain at the current site and/or a mechanism to allow the user to ignore the warning and proceed to the destination site. An example screen shot of a warning message displayed to a user is described in further detail below with respect to FIG. 3.

In one implementation, the process 200 may conclude after the warning is provided for display to the user. In another implementation, in step 206, the system receives an indication of a user selection In step 207, the system determines whether the user has selected to proceed to the destination site associated to the link (e.g., using a mechanism provided to the user). If, it is determined that the user has selected to proceed to the site, then in step 204, the system redirects the user to the destination site of the link. Otherwise, in step 208, any action by the user with respect to the link may be ignored and the user is allowed to remain at his/her current location. The user's selection may further be received and used to update the list or other historical information relating to the process of determining the reputation of a link.

Figure 3:
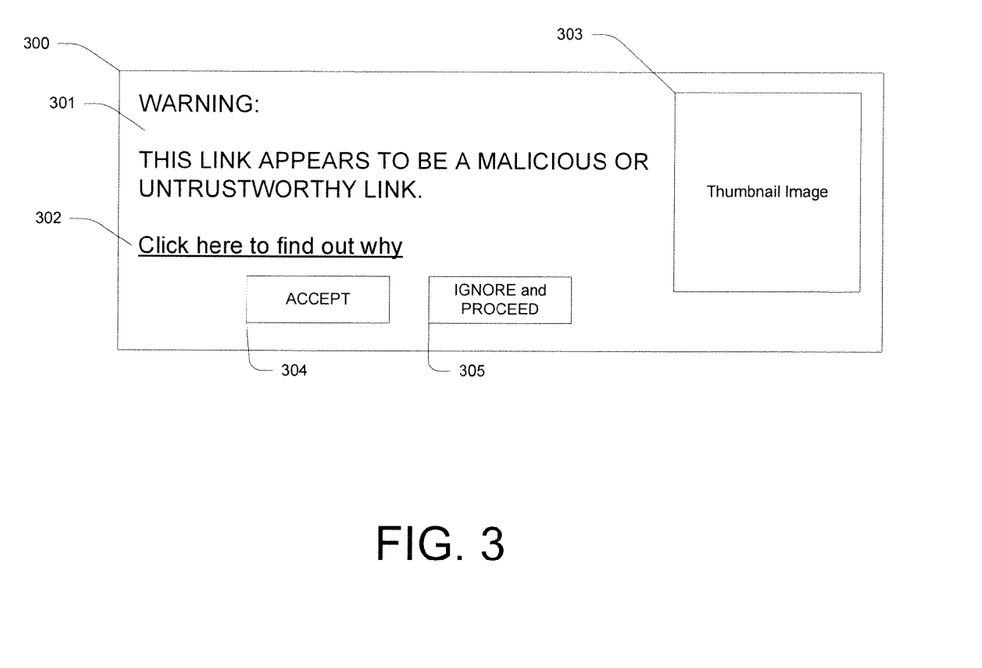
FIG. 3 illustrates an example warning message which may be provided to a user in association with a link determined to have a reputation indicating an undesirable, untrustworthy and/or malicious site.

FIG. 3 illustrates an example warning message which may be provided to a user in association with a link determined to have a reputation indicating an undesirable, untrustworthy and/or malicious site. As illustrated, the warning screen 300 includes a warning message 301, which notifies the user that the link is determined to have a reputation indicating that the site is undesirable, untrustworthy and/or malicious.

Furthermore, the warning screen includes an explanation link 302, which provides the user with means to learn the reasons for the determination that the link is associated with an undesirable, untrustworthy and/or malicious site. The warning screen further includes a thumbnail image 303 which allows the user to view the main page of the destination site, which may allow the user to judge whether to proceed to the site based on visual representation of the site. The destination site may include the first site that is displayed to the user in result of the link or may be the final site after one or more redirects. If a pop-up or other secondary content is also associated with the link, the thumbnail image 303 may include these images or additional images may be provided. Additionally, the warning screen 300 includes an "accept" button 304, which lets the user remain at the current location (e.g., where the user decides, based on the warning, that he/she does not wish to proceed to the destination site associated with the link) and a "ignore and proceed" button 305, which causes the system to redirect the user to the destination site despite the warning. Other items may be included on the warning screen in other implementations of the warning screen provided for display to the user.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
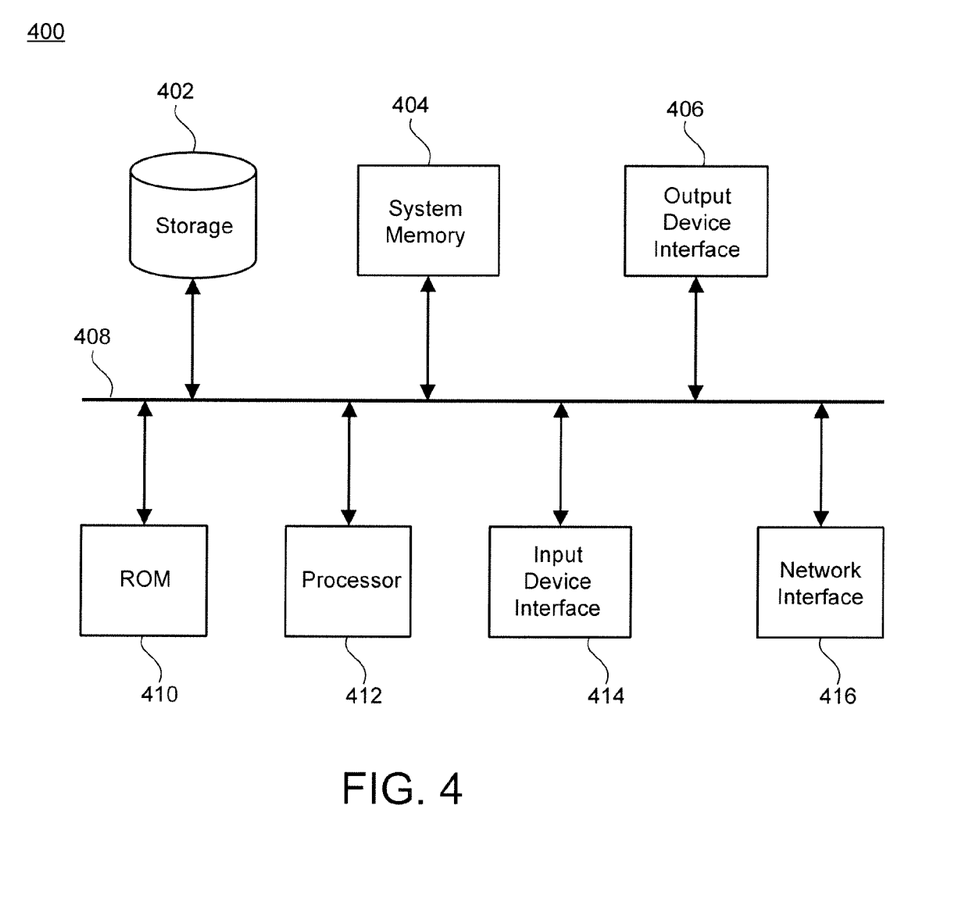
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for detecting and warning users regarding undesirable, untrustworthy and/or malicious sites according to various embodiments. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method for providing an indication of a quality of a site to a user, the method comprising:
   identifying a link displayed at a source site;
   determining a reputation of the link based on one or more criteria and determining whether the determined reputation of the link meets or exceeds a specified threshold, wherein the determining the reputation of the link includes determining the reputation of a set of pages that will be displayed to the user in response to the user following the link without further interaction from the user, wherein the set of pages comprises a destination page and one or more other pages displayed immediately following the user following the link, and determining if the reputation of any of the set of pages meets or exceeds the specified threshold; and
   providing a warning for display to the user at the source site when it is determined that the reputation of the link meets or exceeds the specified threshold, wherein the warning includes a warning message indicating that the link meets or exceeds the specified threshold and a thumbnail image-for one or more pages of the set of pages.

2. The method of claim 1, wherein the identification step is performed in response to receiving an indication of a user action with respect to the link.

3. The method of claim 1, wherein the identification step comprises identifying one or more links including the link being displayed at the source site, each link being associated with a page displayable to the user in response to the user following the link.

4. The method of claim 1, wherein the one or more criteria includes user feedback data regarding the link or at least one page of the set of pages.

5. The method of claim 1, wherein the one or more criteria includes one or more characteristics associated with an untrustworthy or malicious link.

6. The method of claim 5, wherein the one or more characteristics include one or more of a format of the name of the link, a number of redirects before a user will be directed to the destination site, an identification of a user posting the link, or characteristics of the destination site.

7. The method of claim 1, wherein the one or more criteria includes historical information regarding user interaction with the link or the destination site.

8. The method of claim 1, further comprising:
   providing the user with a mechanism for accepting the warning, wherein upon detecting that the user has accepted the warning, the user will remain at the source site.

9. The method of claim 1, further comprising:
   providing the user with a mechanism for ignoring the warning, such that the user is redirected to the destination site.

10. The method of claim 1, wherein the providing step comprises:
    requesting the thumbnail image of each page of the set of pages meeting or exceeding the specified threshold if the reputation of any of the pages of the set of pages meets or exceeds the specified threshold;
    receiving the thumbnail image; and
    generating the warning comprising the warning message and the thumbnail image.

11. The method of claim 1, further comprising:
    identifying one or more information regarding the link or in response to identifying the link.

12. The method of claim 11, wherein the information comprises one or more of a name of the link, a user posting the link, or a number of redirects associated with the link.

13. The method of claim 11, wherein the determining the reputation of the link comprises calculating a reputation score for the link based on comparing the information regarding the link and the one or more criteria.

14. The method of claim 13, wherein the determining whether the determined reputation of the link meets or exceeds a specified threshold comprises determining whether the reputation score meets or exceeds the specified threshold.

15. A system for providing an indication of a quality of a site to a user, the system comprising:
    one or more processors; and
    a non-transitory machine-readable medium comprising instructions stored therein, which when executed by the processors, cause the processors to perform operations comprising:
        receiving an indication of a user action with respect to a link associated with a destination site and being displayed on a source site;
        determining a reputation of the link based on one or more criteria and determining whether the determined reputation of the link meets or exceeds a specified threshold, wherein the determining the reputation of the link includes determining the reputation of a collection of pages that are displayed to the user in response to the user following the link and without further interaction from the user, and determining if any of the collection of pages meets or exceeds the specified threshold and wherein the determined reputation meeting or exceeding the specified threshold indicates that the link is associated with an undesirable, untrustworthy or malicious site; and providing a warning for display to the user at the source site when it is determined that the determined reputation of the link meets or exceeds the specified threshold, wherein the displayed warning includes a warning message indicating that the reputation meets or exceeds the specified threshold and a thumbnail image of one or more pages of the collection of pages including at least one of the pages of the collection of pages other than the destination site.

16. The system of claim 15, wherein the one or more criteria includes one or more of user feedback data regarding the link or the collection of pages one or more characteristics indicative of the link reputation, or historical information regarding user interaction with one or more of the link or the collection of pages.

17. The system of claim 15, wherein the one or more characteristics include one or more of a format of the name of the link, a number of redirects before a user will be direct to the destination site, an identification of a user posting the link, or characteristics of one or more pages of the collection of pages.

18. A non-transitory machine-readable medium comprising instructions stored therein, which when executed by a machine, cause the machine to perform operations comprising:

identifying a link associated with a destination site and being displayed on a source site being viewed by a user;

determining a reputation of the link based on one or more criteria including one or more of user feedback data regarding the link or one or more pages that will be displayed to the user upon the user following the link without further interaction from the user, one or more characteristics indicative of the link reputation, or historical information regarding user interaction with one or more of the link or one or more pages that will be displayed to the user upon the user following the link;

determining whether the determined reputation of the link meets or exceeds a specified threshold indicating that the link is undesirable, untrustworthy or malicious; and providing a warning for display to the user at the source site when it is determined that the reputation of the link meets or exceeds the specified threshold, wherein the warning displayed includes a thumbnail image for the destination page and at least one other page of the pages that will be displayed to the user upon the user following the link.

19. The machine-readable medium of claim 18, the operation further comprising:

identifying one or more information regarding the link or the destination site in response to identifying the link, wherein the information comprises one or more of a name of the link, a user posting the link, a number of redirects associated with the link, or the destination site.

20. The machine-readable medium of claim 19, wherein the determining the reputation of the link comprises calculating a reputation score for the link based on comparing the information regarding the link and the one or more criteria.

* * * * *